(12) United States Patent
Pompei

(10) Patent No.: US 7,106,180 B1
(45) Date of Patent: Sep. 12, 2006

(54) DIRECTIONAL ACOUSTIC ALERTING SYSTEM

(76) Inventor: Frank Joseph Pompei, 16 Peck Ave., Wayland, MA (US) 01778

( * ) Notice: Subject to any disclaimer, the term of this patent is extended or adjusted under 35 U.S.C. 154(b) by 0 days.

(21) Appl. No.: 10/233,172

(22) Filed: Aug. 30, 2002

Related U.S. Application Data

(60) Provisional application No. 60/316,062, filed on Aug. 30, 2001.

(51) Int. Cl.
*G08B 3/10* (2006.01)

(52) U.S. Cl. ............................... 340/384.7; 340/573.2; 340/573.4; 340/384.2; 340/384.6; 116/22 A; 119/719; 381/387; 307/139

(58) Field of Classification Search ............. 340/384.2, 340/384.6, 384.7, 573.2, 901, 573.4, 933; 367/139; 116/22 A; 119/719; 381/387, 381/389
See application file for complete search history.

(56) References Cited

U.S. PATENT DOCUMENTS

| | | | | |
|---|---|---|---|---|
| 4,903,630 | A | | 2/1990 | Rezmer ...................... 116/22 A |
| 4,998,091 | A | | 3/1991 | Rezmer ....................... 340/384 |
| 5,602,523 | A | * | 2/1997 | Turchioe et al. .......... 340/384.2 |
| 5,724,919 | A | * | 3/1998 | Boyd et al. .................. 119/719 |
| 6,250,255 | B1 | | 6/2001 | Lenhardt et al. ............. 119/713 |
| 6,388,949 | B1 | * | 5/2002 | Lenhardt ..................... 367/139 |
| 6,556,687 | B1 | * | 4/2003 | Manabe ....................... 381/387 |
| 6,577,738 | B1 | * | 6/2003 | Norris et al. ................. 381/77 |
| 6,580,374 | B1 | * | 6/2003 | Schrage ....................... 340/933 |
| 6,678,381 | B1 | * | 1/2004 | Manabe ........................ 381/77 |

* cited by examiner

*Primary Examiner*—Jeffery Hofsass
*Assistant Examiner*—Samuel J. Walk
(74) *Attorney, Agent, or Firm*—Weingarten, Schurgin, Gagnebin & Lebovici LLP

(57) ABSTRACT

An acoustic warning or alerting system for directing an audible warning signal to at least one intended recipient, while reducing the chance that the warning signal will be heard by others within the proximity of the system. The system includes a modulator for modulating an ultrasonic carrier signal with a processed audio signal, a driver amplifier for amplifying the modulated carrier signal, and a parametric array of acoustic transducers for projecting the modulated and amplified carrier signal through a propagation medium for subsequent regeneration of the audio signal along a pre-selected projection path. The parametric array of audio transducers operates by employing the nonlinear interaction between high frequency sound components and the propagation medium to generate at least one highly directional beam of lower frequency sounds within the propagation medium. The directional acoustic alerting system may be employed as a replacement for conventional alerting systems such as horns, whistles, and bells to assure that primarily only those people and/or animals intended to hear the warning signal actually hear the sound.

8 Claims, 4 Drawing Sheets

DIRECTIONAL ACOUSTIC ALERTING SYSTEM

CROSS REFERENCE TO RELATED APPLICATIONS

This application claims priority of U.S. Provisional Patent Application No. 60/316,062 filed Aug. 30, 2001 entitled DIRECTIONAL ACOUSTIC ALERTING SYSTEM.

STATEMENT REGARDING FEDERALLY SPONSORED RESEARCH OR DEVELOPMENT

N/A

BACKGROUND OF THE INVENTION

The present invention relates generally to acoustic warning or alerting systems, and more specifically to acoustic warning or alerting systems capable of producing highly directional audible sound.

Acoustic warning or alerting systems have been widely employed in a variety of applications. For example, acoustic alerting systems have been employed in vehicles such as automobiles, railroad trains, bicycles, airplanes, and boats for generating sounds to alert people and/or animals of the vehicle's presence. Specifically, horns have been used in automobiles for altering pedestrians of the automobile's approach. Further, horns, bells and/or whistles have been used on trains for altering people and/or animals on or near the railroad tracks of the train's presence. Similar acoustic alerting and alarm systems have also been employed in residential, industrial, and commercial settings, e.g., for generating sounds to warn individuals of dangerous conditions, and to alert intruders that they have entered restricted areas.

However, conventional acoustic alerting systems such as horns, bells, whistles, and alarms have drawbacks in that the sound generated by such systems is often not heard by the intended recipients. Even if the intended recipient hears the sound, he or she may not be sufficiently compelled to react to the sound in the most appropriate manner, such as by moving out of the path of an oncoming vehicle. For example, people who have survived being struck by a train frequently admit that they never heard the train coming until it was too late to move out of the train's way.

The effectiveness of conventional acoustic alerting systems has been enhanced somewhat by configuring them to generate more powerful or more attention-grabbing sounds such as louder or harsher sounds. However, because conventional acoustic alerting systems are generally omnidirectional, the loud and harsh sounds generated by such systems can usually be heard not only by the intended recipients, but also by people who have no need to hear the sounds. For example, although a train whistle is normally intended to be heard only by people and/or animals on or near the railroad tracks, in actuality, people who are a significant distance away from the tracks in all directions may hear the whistle. Specifically, when a train is travelling by a residential neighborhood, residents often complain about the loud warning sound of the train whistle as the train approaches road intersections, even though such warning signals are needed to avoid accidents. As a result, the number of trains allowed to pass, as well as the number of allowable train transit hours, may be severely curtailed near such residential neighborhoods.

Similar drawbacks exist for automobile horns, which are generally intended to be heard only by people and/or animals in front of the automobile. Because the sound generated by automobile horns typically radiates omnidirectionally, all people in the general vicinity of the automobile, including those who have no need to hear the horn, are often forced to listen to the sound. This can increase noise pollution to nuisance levels, especially in highly populated urban areas.

It would therefore be desirable to have an acoustic warning or alerting system that may be employed in a vehicle such as an automobile, a railroad train, a bicycle, an airplane, and a boat, and in residential, industrial, and commercial settings. Such a system would be capable of generating audible sound that is heard primarily by the intended recipient(s), instead of by everyone in the general vicinity of the system. It would also be desirable to have an acoustic alerting system that can generate highly directional sound that may be heard by both humans and animals.

BRIEF SUMMARY OF THE INVENTION

In accordance with the present invention, an acoustic warning or alerting system is provided that may be employed to direct an audible warning signal to one or more intended recipients, while reducing the chance that the warning signal will be heard by others within the proximity of the system. Benefits of the acoustic alerting system are achieved by employing a parametric array of acoustic transducers that can generate beams of audible sound with much higher directivity than conventional audio sound sources.

In one embodiment, the acoustic warning or alerting system comprises a parametric audio sound system including a modulator for modulating an ultrasonic carrier signal with a processed audio signal, a driver amplifier for amplifying the modulated carrier signal, and a parametric array of acoustic transducers for projecting the modulated and amplified carrier signal through a propagation medium (e.g., air or water) for subsequent regeneration of the audio signal along a pre-selected projection path. In a preferred embodiment, each of the acoustic transducers in the parametric array is a membrane-type transducer. The driver amplifier includes an inductor coupled to the capacitive load of the membrane-type transducer to form a resonant circuit. The center frequency of the membrane-type transducer, the resonance frequency of the resonant circuit formed by the driver amplifier coupled to the membrane-type transducer, and the frequency of the ultrasonic carrier signal are equal to the same predetermined value, preferably, at least 45 kHz.

In the presently disclosed embodiment, the parametric array of audio transducers operates by employing the nonlinear interaction between high frequency sound components, preferably in the ultrasonic frequency range, and the propagation medium to generate at least one beam of lower frequency sounds within the propagation medium. The result is a "virtual" sound source that is significantly larger than the wavelengths of the sounds generated by it. The larger the source of the sound, particularly in the axial direction (i.e., in the direction of propagation of the sound beam), the greater its directivity.

Accordingly, if a virtual sound source comprising a relatively long beam of ultrasound is generated using multiple frequencies, then the nonlinear interaction between the ultrasound and the propagation medium (e.g., air or water) may be used to generate a narrow beam of audible sound. It should be understood that the directivity of the sound generated by the parametric array of audio transducers can be further controlled by creating a virtual sound source that comprises one or more beams of ultrasound in any suitable geometric configuration, e.g., a cylinder or a plane.

The presently disclosed directional acoustic alerting system may be employed as a replacement for conventional vehicle alerting systems such as horns, whistles, and bells to assure that primarily only those people and/or animals directly in front of the vehicle (even at significant distances away from the vehicle) hear the sound. As a result, louder and more attention-grabbing sounds may be generated by the acoustic alerting system without disturbing others within the proximity of the system.

In an alternative embodiment, the presently disclosed directional acoustic alerting system may be employed as an acoustic beacon in conjunction with, e.g., relatively quiet vehicles such as electric cars, and vehicles operating at high speeds. Such an acoustic beacon may actively or passively alert people and/or animals in the path of the oncoming vehicle.

In further alternative embodiments, the presently disclosed directional acoustic altering system may be employed with signaling apparatus at crosswalks, public/private parking garage entrances and exits, and other settings where pedestrians may be at risk of being struck by vehicles. Further, because the directional acoustic alerting system generates a very narrow beam of audible sound, the audio sound beam generated by the system may be employed to guide visually impaired individuals along crosswalks, or to guide the public at large through expansive areas such as airports or shopping malls.

By providing a directional acoustic alerting system that includes at least one parametric array of acoustic transducers as described above, audible warning signals can be generated that are heard primarily by the intended recipients of the signal (i.e., humans and/or animals), without unduly distracting others within the proximity of the system.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

U.S. Provisional Patent Application No. 60/316,062 filed Aug. 30, 2001 entitled DIRECTIONAL ACOUSTIC ALERTING SYSTEM is incorporated herein by reference.

An acoustic warning or alerting system is disclosed that can direct at least one audible warning signal to one or more intended recipients, while minimizing the chance that the warning signal will be heard by others within the proximity of the system. The presently disclosed directional acoustic alerting system includes a parametric array of acoustic transducers configured to generate one or more beams of audible sound with a directivity that is significantly greater than that of audio sound generated using conventional acoustic warning or alerting techniques.

Figure 1:
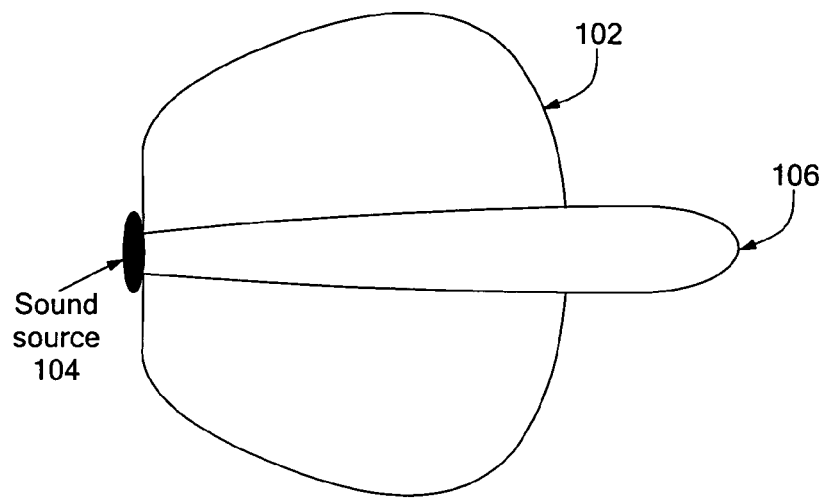
FIG. 1 is a diagram illustrating a conceptual distribution of audio sound generated by a conventional acoustic alerting system, and a conceptual distribution of a narrow audio beam generated by a directional acoustic alerting system according to the present invention.

FIG. 1 depicts an illustrative distribution 102 of audio sound generated by a conventional acoustic warning or alerting system (not shown) at a sound source location 104, and an illustrative distribution 106 of a narrow audio beam generated by a directional acoustic alerting system 300 (see FIG. 3) according to the present invention at substantially the same location 104. For example, the conventional acoustic warning or alerting system may comprise a conventional horn, bell, whistle, or alarm. As shown in FIG. 1, the distribution 102 of audio sound generated using conventional techniques spreads out up to 180° or more from the sound source location 104. In contrast, the audio sound distribution 106 generated by the directional acoustic alerting system 300 comprises an audio sound beam that diverges only a few degrees as it propagates from the sound source location 104.

Accordingly, rather than propagating essentially everywhere like the conventional audio sound distribution 102, the audio sound beam represented by the audio sound distribution 106 propagates in a tight, directional beam that can be controlled with a high level of precision. This may be more easily understood by way of a lighting analogy—whereas the sound generated by a conventional audio source propagates essentially in all directions like the light produced by a light bulb, the sound generated by the directional acoustic alerting system 300 propagates in a directional manner like the light produced by a spotlight or a laser.

Figure 2:
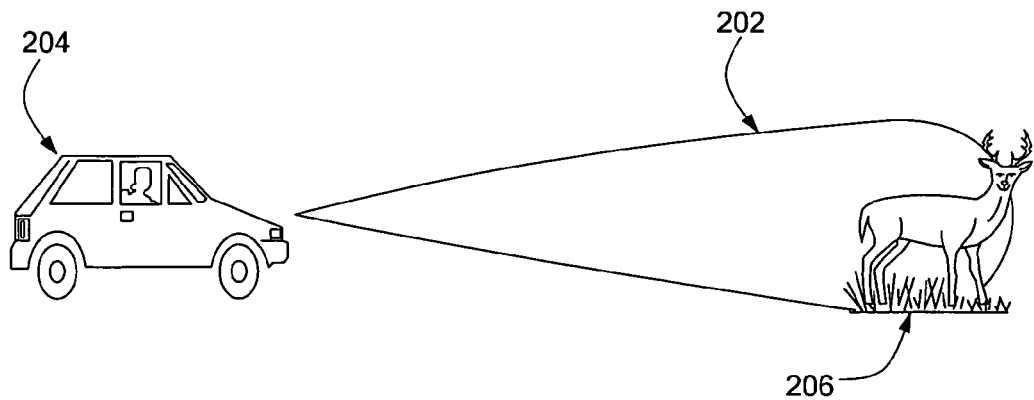
FIG. 2 is a diagram depicting an illustrative use of the narrow audio beam of FIG. 1, generated by the presently disclosed directional acoustic alerting system.

FIG. 2 depicts an illustrative use of the presently disclosed directional acoustic alerting system, which is operative to generate a narrow audio beam 202 having a distribution like the above-described audio sound distribution 106 (see FIG. 1). As shown in FIG. 2, the directional acoustic alerting system is configured for use in an automobile 204 to supplement or replace a conventional automobile horn (not shown). It is understood, however, that the directional acoustic alerting system may alternatively be configured for use with a railroad train, a bicycle, an airplane, a boat, or any other suitable vehicle, or in a residential, industrial, commercial, or any other suitable type of setting. Using the directional acoustic alerting system in conjunction with a vehicle such as the automobile 204 may reduce the occurrence of accidents involving pedestrians or animals such as a deer 206 in the roadway ahead of the vehicle. For example, during the nighttime hours, the deer 206 may not be scared off by the oncoming automobile 204, but instead may become "frozen" in the vehicle's headlights, since such animals are normally unaccustomed to the threat associated with approaching lights. However, such animals generally react strongly and instinctively to sound, and therefore even a modest warning sound may scare the deer 206 away from the oncoming automobile 204. Because the directional acoustic alerting system generates the narrow audio sound beam 202 propagating from the front of the automobile 204, the deer 206 can be warned of and scared away from the oncoming automobile 204 without disturbing others who may be in the surrounding area. It should be appreciated that the directional acoustic alerting system may alternatively be configured to generate narrow audio sound beams that propagate from the rear of a vehicle to warn individuals that the vehicle is backing up.

Figure 3:
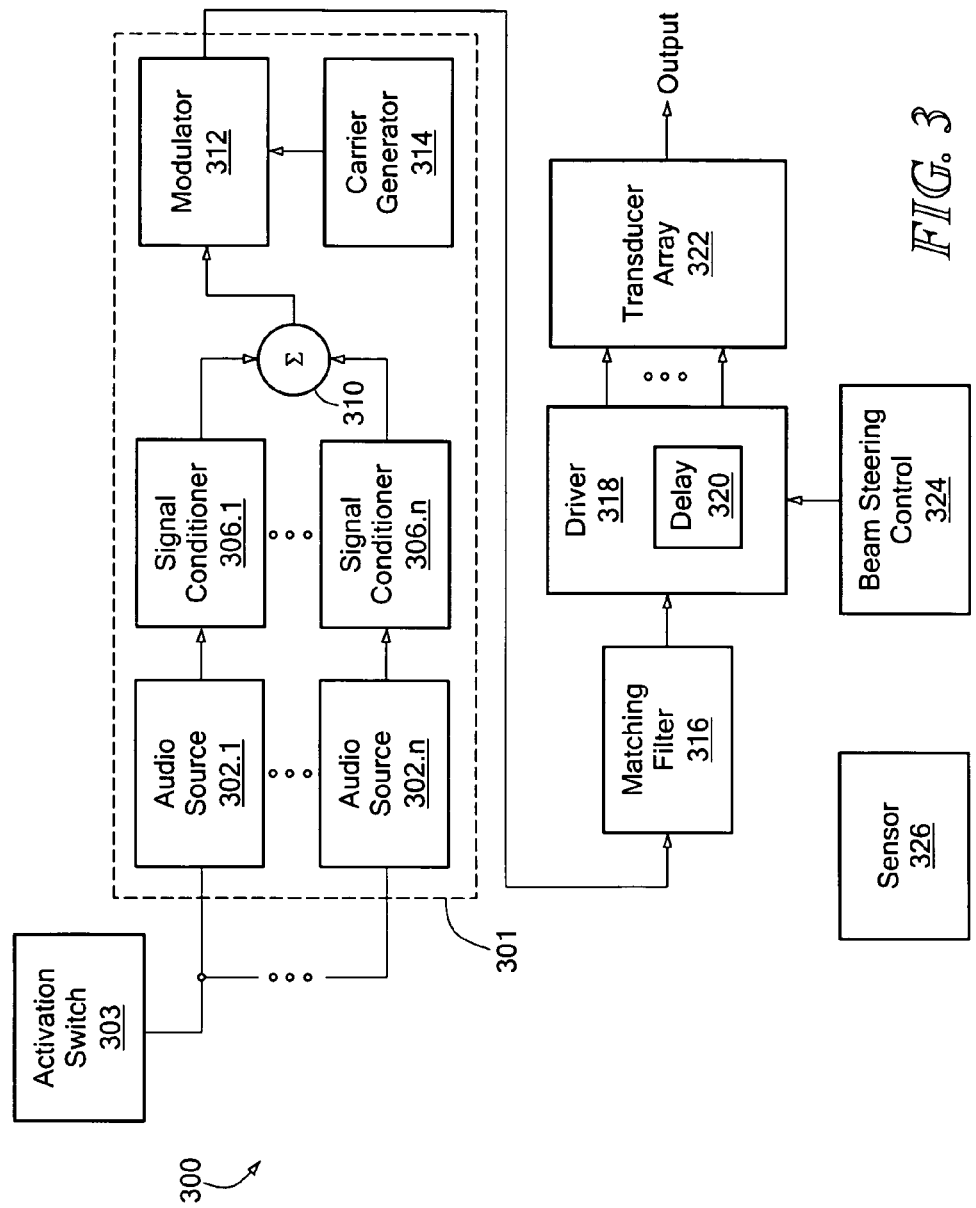
FIG. 3 is a block diagram of the presently disclosed directional acoustic alerting system.

FIG. 3 depicts an illustrative embodiment of the directional acoustic alerting system 300, in accordance with the present invention. In the illustrated embodiment, the directional acoustic alerting system 300 comprises a parametric audio sound system including a signal generator 301, an optional matching filter 316, a driver amplifier 318 coupleable to optional beam steering control circuitry 324, and an acoustic transducer array 322, which comprises one or more acoustic transducers. A parametric audio system like the parametric audio sound system included in the directional acoustic alerting system 300 is disclosed in co-pending U.S. patent application Ser. No. 09/758,606 filed Jan. 11, 2001 entitled PARAMETRIC AUDIO SYSTEM, which is incorporated herein by reference.

Specifically, the acoustic transducers of the transducer array 322 are configured to be driven by the signal generator 301, which includes a modulator 312 coupled to an ultrasonic carrier signal generator 314, and one or more audio signal sources 302.1–302.$n$. For example, the directional acoustic alerting system replacing the conventional horn in the automobile 204 (see FIG. 2) may be configured to allow a human operator to trigger an activation switch 303 (see FIG. 3), thereby providing signal flows through respective lines suitable for activating the audio signal sources 302.1–302.$n$. Optional signal conditioning circuits 306.1–306.$n$ receive respective audio signals generated by the audio signal sources 302.1–302.$n$, and provide conditioned audio signals to a summer 310. It is noted that such conditioning of the audio signals may alternatively be performed after the audio signals are summed by the summer 310. The modulator 112 receives a composite audio signal from the summer 310 and an ultrasonic carrier signal from the carrier generator 314, and modulates the ultrasonic carrier signal with the composite audio signal. The modulator 312 is preferably adjustable in order to vary the modulation index. Amplitude modulation by multiplication with a carrier is preferred, but because the ultimate goal of such modulation is to convert audio-band signals into ultrasound, any form of modulation that can have that result may be used. The modulator 312 provides the modulated carrier signal to the optional matching filter 316, which is configured to compensate for the generally non-flat frequency response of the driver amplifier 318 and the acoustic transducer array 322. The matching filter 316 provides the modulated carrier signal to the driver amplifier 318, which in turn provides an amplified version of the modulated carrier signal to the acoustic transducers of the acoustic transducer array 322. The driver amplifier 318 may include a delay circuit 320 configured to apply a relative phase shift and/or amplitude shading across multiple frequencies of the modulated carrier signal in order to steer, focus, or shape the ultrasonic beam provided at the output of the acoustic transducer array 322. The ultrasonic beam, which comprises the high intensity ultrasonic carrier signal amplitude-modulated with the composite audio signal, is demodulated on passage through the propagation medium, e.g., the air, due to the non-linear propagation characteristics of the air, thereby generating an audible warning sound or signal. To increase the level of the audible warning signal, the acoustic transducer array 322 is preferably configured to maximize the effective surface area of the plurality of acoustic transducers.

In the preferred embodiment, the frequency of the carrier signal generated by the ultrasonic carrier signal generator 314 is on the order of 45 kHz or higher. Because the audio signals generated by the audio signal sources 302.1–302.$n$ typically have a maximum frequency of about 20 kHz, the lowest frequency components of substantial intensity according to the strength of the audio signal in the modulated ultrasonic carrier signal have a frequency of about 25–35 kHz or higher. Such frequencies are typically above the audible range of human hearing.

Figure 4:
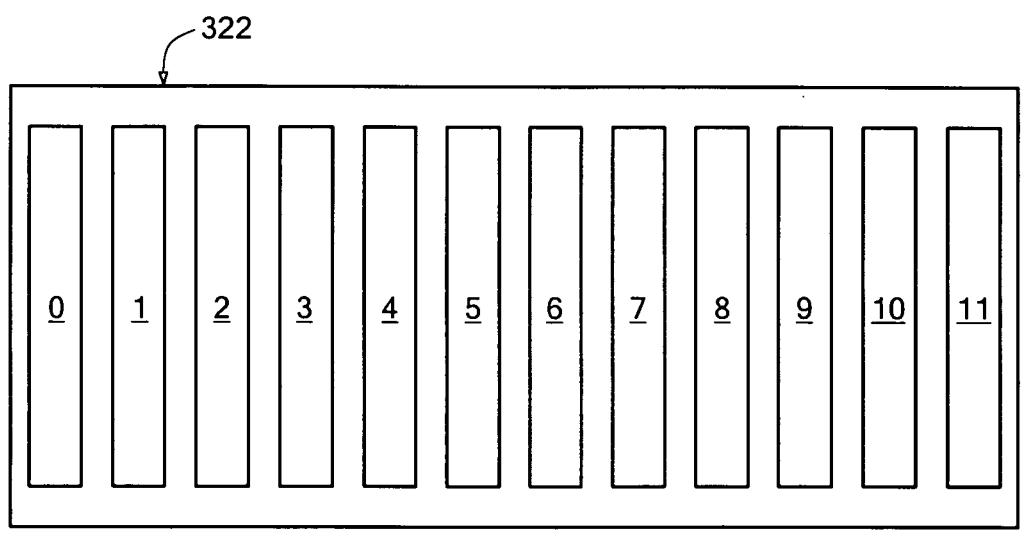
FIG. 4 is a simplified plan view of a parametric array of acoustic transducers included in the directional acoustic alerting system of FIG. 3.

FIG. 4 depicts an illustrative embodiment of the parametric array 322 of acoustic transducers included in the directional acoustic alerting system 300 (see FIG. 3). In the illustrated embodiment, the acoustic transducer array 322 (see FIG. 4) includes a plurality of acoustic transducers 0–11 arranged in a one-dimensional configuration. It should be understood, however, that the plurality of acoustic transducers may alternatively be arranged in 2–3 dimensional configurations. Further, each of the acoustic transducers 0–11 has a generally rectangular shape to facilitate close packing in the one-dimensional configuration. It should be understood, however, that other geometrical shapes and configurations of the acoustic transducers may be employed. For example, the acoustic transducers may be suitably shaped for arrangement in an annular or "ring" configuration. In the preferred embodiment, each of the acoustic transducers 0–11 comprises a capacitor transducer, and more particularly a membrane-type transducer such as a membrane-type PVDF transducer, a membrane-type electret transducer, or a membrane-type electrostatic transducer (e.g., a Sell-type electrostatic transducer). It is noted that the bandwidth of the acoustic transducer array 322 is preferably on the order of 5 kHz or higher, and more preferably on the order of 10 kHz or higher as enhanced by the matching filter 316. Membrane-type transducers suitable for use in the directional acoustic alerting system 300 are described in co-pending U.S. patent application Ser. No. 09/300,200 filed Apr. 27, 1999 entitled ULTRASONIC TRANSDUCERS, which is incorporated herein by reference.

Figure 5:
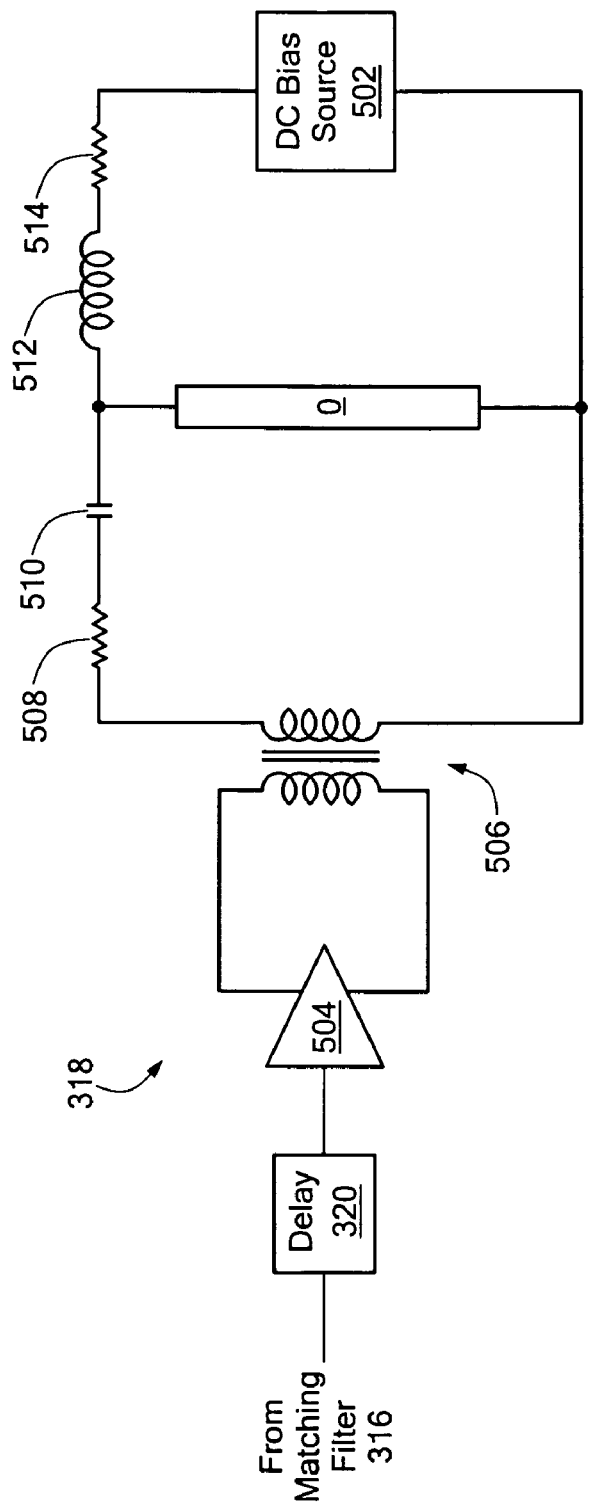
FIG. 5 is a schematic diagram of a driver amplifier circuit included in the directional acoustic alerting system of FIG. 3.

FIG. 5 depicts an illustrative embodiment of the driver amplifier 318 included in the directional acoustic alerting system 300 (see FIG. 3). In the illustrated embodiment, the driver amplifier 318 includes the delay circuit 320, an amplifier 504, a transformer 506, resistors 508 and 514, a capacitor 510, an inductor 512, the acoustic transducer 0, and a DC bias source 502. It is noted that a respective delay circuit 320 is preferably provided for each one of the acoustic transducers 0–11 (see FIG. 4). FIG. 5 shows the driver amplifier 318 driving only the acoustic transducer 0 for clarity of discussion.

As shown in FIG. 5, the delay circuit 320 receives the modulated carrier signal from the matching filter 316 (see FIG. 3), applies a relative phase shift and/or amplitude shading to the modulated carrier signal for steering/focusing/shaping the ultrasonic beam generated by the acoustic transducer array 322, and provides the modulated carrier signal to the amplifier 504. The primary winding of the transformer 506 receives the output of the amplifier 504, and the secondary winding of the transformer 506 provides a stepped-up voltage to the series combination of the acoustic transducer 0, the resistor 508, and the blocking capacitor 510. Further, a DC bias is applied to the acoustic transducer 0 from the DC bias source 502 via the isolating inductor 512 and the resistor 514. The capacitor 510 has relatively low impedance and the inductor 512 has relatively high impedance at the operating frequency of the driver amplifier 318. Accordingly, these components typically have minimal effect on the operation of the circuit except to isolate the AC and DC portions of the circuit from one another. In an alternative embodiment, the inductor 512 may be replaced by a very large resistor value. It is noted that the blocking capacitor 510 may be omitted when the DC bias is provided by an electret.

In a preferred embodiment, the secondary winding of the transformer 506 is configured to resonate with the capacitance of the acoustic transducer 0 at the center frequency of the acoustic transducer 0, e.g., 45 kHz or higher. This effectively steps-up the voltage across the acoustic transducer and provides a highly efficient coupling of the power from the driver amplifier 318 to the acoustic transducer. Without the resonant circuit formed by the secondary winding of the transformer 506 and the acoustic transducer capacitance, the power required to drive the directional acoustic alerting system 300 would be very high, i.e., on the order of hundreds of watts. With the resonant circuit, the power requirement reduction corresponds to the Q-factor of resonance. It is noted that the electrical resonance frequency of the driver amplifier 318, the center frequency of the acoustic transducer 0, and the ultrasonic carrier frequency preferably have the same frequency value.

As described above, the delay circuit 320 (see FIGS. 3 and 5) applies a relative phase shift and/or amplitude shading across multiple frequencies of the modulated carrier signal to steer, focus, or shape ultrasonic beams generated by the acoustic transducer array 322. The acoustic transducer array 322, particularly the one-dimensional acoustic transducer array 322 of FIG. 4, is therefore well suited for use as a phased array. Such phased arrays may be employed for electronically steering audio beams toward desired locations along selected projection paths, without requiring mechanical motion of the acoustic transducer array 322. Further, the phased array may be used to vary audio beam characteristics such as the beam width, focus, and spread.

Specifically, the acoustic transducer array 322 is configured to operate as a phased array by manipulating the phase relationships between the acoustic transducers included therein to obtain a desired interference pattern in the ultrasonic field. For example, the one-dimensional acoustic transducer array 322 (see FIG. 4) may manipulate the phase relationships between the acoustic transducers 0–11 via the delay circuit 320 (see FIGS. 3 and 5) so that constructive interference of ultrasonic beams occurs in one direction. As a result, the one-dimensional acoustic transducer array 322 steers the modulated ultrasonic beam in that direction electronically. Further, the direction of the modulated ultrasonic beam may be changed in real-time via the beam steering control circuitry 324 (see FIG. 3).

Having described the above illustrative embodiment of the directional acoustic alerting system, other alternative embodiments or variations may be made. For example, the audible warning signal generated by the system incorporated in the automobile 204 (see FIG. 2) may always be present, e.g., by sending a pulsed signal in the direction of the vehicle's motion. Alternatively, the warning signal may be activated by the automobile operator, or it may be activated automatically when necessary, e.g., based on the vehicle's speed and the detected distance to an object, which may be sensed by optical, acoustic, or infrared (IR) ranging techniques. For example, an IR sensor 326 (see FIG. 3) may be used to detect the presence of a pedestrian or animal in the path of the vehicle, at which time the directional acoustic alerting system may issue warning signals to the vehicle operator and/or the pedestrian or animal in the vehicle's path. It is noted that appropriate choices of sounds and/or sound frequencies may be required to elicit the most marked response from the intended recipients of the sound. In some instances, it may be desirable to choose a sound that can be heard by animals, but not by humans. Because of the nature of the parametric transducer array included in the directional acoustic alerting system, a warning sound having a rich structure, including high frequencies, is generally preferred.

An advantage of using the parametric array of acoustic transducers to generate warning signals is that the perception of distance from the audio sound source can be easily manipulated. Those of ordinary skill in this art may appreciate that the ear and brain of a human (or animal) generally distinguishes the distance from an audio source by the amount of reverberation (i.e., echo) in the audio stream. If there is substantial reverberation (such as from a distant sound source), then the ear normally perceives the sound source to be far away. When using the parametric transducer array to generate sound, the sound reaching the ear of the intended recipient contains virtually no natural reverberation. As a result, the intended recipient will normally perceive the sound source to be closer than it actually is. This can be very helpful in warning distant people and/or animals of an approaching vehicle. If a greater perceived distance from the sound source is desired, then artificial reverberation or other suitable sonic manipulation may be employed to achieve that perception.

Although the parametric transducer array of the directional acoustic alerting system has been described as being steerable by a phased array, the parametric transducer array may alternatively be steered by mechanical methods, or a segmented multi-transducer (with various segments aimed in various directions). The beam can then be steered at the command of a human operator or via automated methods (e.g., such steering may be integrated with on-board sensors such as IR, sound, or distance sensors) to direct the sound in the intended direction, rather than merely straight ahead. The particular steering angle of the parametric transducer array may also be made to correspond to the vehicle's direction, e.g., the direction in which momentum is currently carrying the vehicle. It is noted that the directional acoustic alerting system may be employed in combination with conventional sound generating devices.

The method of sound generation used in the presently disclosed directional acoustic alerting system makes it possible to have more elaborate control over the audio sound distribution. For example, the audible sound may be spread horizontally in a "fan" shape to cover more horizontal area. This may be accomplished by altering the shape of the ultrasonic sound source, or the distribution of signals within the ultrasonic beam (e.g., by using a suitably curved sound source).

Other applications of the presently disclosed directional acoustic alerting system include configuring the system for use at crosswalks, at public/private parking garage entrances and exits, or at any other location where pedestrians are at risk of being struck by a vehicle. For example, at a crosswalk, bells and/or buzzers are traditionally used to guide visually impaired individuals across the roadway. However, such conventional bells and buzzers can be heard in all directions, and therefore the pedestrian may be confused as to which way to walk (neighbors may also become annoyed by the bells and buzzers). The directional acoustic alerting system, on the other hand, may be employed to transmit a linear acoustic beacon across the roadway, so that as long as the visually impaired individual remains within the coverage area of the sound source, he or she would be guided across the roadway. A similar technique may also be used to guide people through expansive public areas such as airports and shopping malls.

At parking garage entrances and exits, bells and lights are traditionally employed to warn pedestrians near the garage that a vehicle is approaching. Such bells and lights are typically triggered by sensors that detect the presence of the vehicle. These conventional bells and lights may be supplemented with or replaced by the directional acoustic alerting system, which would be configured for specifically targeting only those people about to cross by the parking garage entrance/exit, without distracting others nearby.

Moreover, the presently disclosed directional acoustic alerting system may be employed to supplement or replace loudspeakers over escalators and/or moving sidewalks at airports and other locations. For example, the directional acoustic alerting system may be configured to generate verbal warning signals, which alert specific groups of passengers without bothering other passengers who may be nearby. This may be accomplished by mounting a parametric loudspeaker of the directional acoustic alerting system overhead, and aiming the parametric loudspeaker toward the end of the escalator or moving sidewalk.

It is noted that the parametric transducer array of the presently disclosed directional acoustic alerting system requires the generation of relatively high levels of ultrasound. Depending on the particular sound to be produced, as well as the environmental and power requirements, a variety of acoustic transducers may be employed, including but not limited to piezoelectric transducers, electrostatic transducers, PVDF film transducers, electrostrictive film transducers, and pneumatic whistles.

Moreover, a suitable set of ultrasonic frequencies may be generated to maximize output while maintaining a reasonably pleasing (and effective) alarm sound. This can be accomplished by using several highly resonant ultrasonic transducers, each transducer or set of transducers being tuned to a particular frequency. Further, suitable signals may be fed to the transducers to vibrate them, and the resulting audio output may be determined by the nonlinear interaction (essentially, the difference in frequency) between the ultrasonic frequencies. Because the acoustic transducers can be made highly resonant, they can be very efficient. As described above, the acoustic transducers can be driven by resonant-drive amplifiers, each being tuned to resonate with the transducer set at the particular frequency it is intended to produce. Because the acoustic transducers are generally capacitive, resonance may be produced by matching them with series or parallel inductance, the value of which is chosen to achieve resonance at the desired output frequency. The mechanical resonance can be tuned by adjusting the moving mass of the vibrating surface (e.g., by applying epoxy to the transducer), or by adjusting the compliance of the transducer (e.g., by altering the transducer's internal vibration structure and restoring force mechanisms). In commercially available piezoelectric transducers, this can be accomplished by adding epoxy or a similar substance to add mass to the transducer, thereby reducing the transducer's resonant frequency. For electrostatic acoustic transducers, the mass of the membrane can be altered. For Sell-type acoustic transducers, the space beneath the transducer film can be changed to alter the resonant frequency. This is conveniently done by modifying the depths of the spaces underneath the transducer (see, e.g., the above-referenced U.S. patent application Ser. No. 09/758,606 filed Jan. 11, 2001 entitled PARAMETRIC AUDIO SYSTEM). Similarly, a pneumatic whistle, which produces a range of ultrasonic frequencies, may be used to produce the desired audio sounds.

Those of ordinary skill in this art will appreciate that for a power-limited system, the optimal spectral amplitudes for partial "n" are $$A\_n = \sin(n\pi/(N+1)), \quad (1)$$

where "N" is the number of spectral components. For an amplitude-limited system, the result is comparable to equation (1), above. In the preferred embodiment, the spectral components are chosen to maximize the audible sound, based on the constraints of power, amplitude, and/or bandwidth.

In an alternative embodiment, the directional acoustic altering system may include a light source, which can be activated at about the same time as the audio sound source. For example, the ultrasonic source may be arranged as a ring surrounding the source of light, which may be an automobile headlamp. In this way, the sound and light will propagate in about the same direction, and minimal additional area on the vehicle will be required for the implementation. Alternatively, the ultrasonic generation mechanism may be configured to surround an exhaust port, a front grill, or any other suitable part of the vehicle.

In each of the above-described embodiments, other suitable directional sound sources such as horn apertures or phased arrays may be used in place of or in combination with the parametric array of acoustic transducers. Moreover, the directional acoustic alerting systems described above may be combined with conventional systems. For example, an automobile may have a conventional horn to alert all people and/or animals nearby, as well as the directional acoustic alerting system for specifically alerting people/animals in the path of the oncoming vehicle.

It will further be appreciated by those of ordinary skill in the art that modifications to and variations of the above-described directional acoustic alerting system may be made without departing from the inventive concepts disclosed herein. Accordingly, the invention should not be viewed as limited except as by the scope and spirit of the appended claims.

What is claimed is:

1. An alarm system for a vehicle operable to produce at least one audible alarm sound signal for warning and/or alerting at least one human and/or animal in a path of the vehicle, comprising:

a directional sound source comprising an array of acoustic transducers configured to produce the audible alarm sound signal propagating in a predetermined direction, the audible alarm sound signal having a corresponding wavelength, wherein the directional sound source is dimensionally larger than the wavelength of the audible alarm sound signal in the predetermined direction for which directivity is desired, thereby allowing the audible alarm sound signal to be produced as a narrow beam of audible sound, and the system further including an activation unit configured to activate the directional sound source for subsequent production of the audible alarm sound signal for warning and/or alerting the at least one human and/or animal in the vehicle path, and wherein the activation unit is operable by a human operator.

2. The system of claim 1 wherein the directional sound source comprises a phased array.

3. The system of claim 1 further including a delay circuit, wherein the acoustic transducer array comprises a plurality of acoustic transducers, each acoustic transducer being configured to project sound through the propagation medium, and wherein the delay circuit is operative to manipulate selected phase and magnitude relationships between the acoustic transducers to obtain a desired interference pattern.

4. The system of claim 3 wherein the delay circuit is operative to manipulate the selected phase and magnitude relationships between the acoustic transducers so that constructive interference of the projected sound occurs in at least one predetermined direction.

5. A method of producing at least one audible alarm sound signal for use in warning and/or alerting at least one human and/or an animal in a path of a vehicle, comprising the steps of:

producing the audible alarm sound signal propagating in a predetermined direction by a directional sound source comprising an array of acoustic transducers, the audible alarm sound signal having a corresponding wavelength, wherein the directional sound source is dimensionally larger than the wavelength of the audible alarm sound signal in the predetermined direction for which directivity is desired, thereby allowing the audible alarm sound signal to be produced as a narrow beam of audible sound; and activating the directional sound source by an activation unit, wherein the activation unit is operable by a human operator.

6. The method of claim 5 wherein the directional sound source comprises a phased array.

7. The method of claim 5 wherein the acoustic transducer array comprises a plurality of acoustic transducers, and wherein the applying step includes projecting sound through the propagation medium by each acoustic transducer, and manipulating selected phase and magnitude relationships between the acoustic transducers to obtain a desired interference pattern by a delay circuit.

8. The method of claim 7 wherein the applying step further includes manipulating the selected phase and magnitude relationships between the acoustic transducers so that constructive interference of the projected sound occurs in at least one predetermined direction by the delay circuit.

* * * * *